() United States Patent  
Jian et al.

(10) Patent No.: US 9,690,584 B2  
(45) Date of Patent: Jun. 27, 2017

(54) SYSTEMS AND METHODS FOR REGISTER ALLOCATION (71) Applicant: Marvell World Trade Ltd., St. Michael (BB)

(72) Inventors: Ningsheng Jian, Shanghai (CN); Yuheng Zhang, Shanghai (CN); Liping Gao, Shanghai (CN); Haitao Huang, Shanghai (CN); Xinyu Qi, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 202 days.

(21) Appl. No.: 14/484,522

(22) Filed: Sep. 12, 2014

(65) Prior Publication Data  
US 2015/0113251 A1  Apr. 23, 2015

Related U.S. Application Data (60) Provisional application No. 61/892,638, filed on Oct. 18, 2013.

(51) Int. Cl.  
*G06F 9/45* (2006.01)  
*G06F 9/30* (2006.01)

(52) U.S. Cl.  
CPC .......... *G06F 9/30098* (2013.01); *G06F 8/441* (2013.01); *G06F 9/30145* (2013.01)

(58) Field of Classification Search  
None  
See application file for complete search history.

(56) References Cited

U.S. PATENT DOCUMENTS

| 4,435,753 | A | * | 3/1984 | Rizzi | G06F 8/441 717/153 |
| 5,261,062 | A | * | 11/1993 | Sato | G06F 8/441 717/153 |
| 5,339,428 | A | * | 8/1994 | Burmeister | G06F 8/441 717/141 |

(Continued)

OTHER PUBLICATIONS

International Search Report & Written Opinion dated Apr. 22, 2015 issued in related/corresponding PCT Patent Appl. No. PCT/IB14/02780 filed Sep. 12, 2014.

(Continued)

*Primary Examiner* — Matthew Brophy (57) ABSTRACT

System and methods are provided for register allocation. An original code block and a target code block associated with a branch of an execution loop are determined. An original allocation of a plurality of physical registers to one or more original variables associated with the original code block is detected. A target allocation of the plurality of physical registers to one or more target variables associated with the target code block is determined. One or more temporary registers are selected from the plurality of physical registers based at least in part on the original allocation and the target allocation. The original allocation is changed to the target allocation using the selected temporary registers. Specifically, one or more instructions are generated to change the original allocation to the target allocation using the selected temporary registers. The instructions are executed using one or more processors.

12 Claims, 5 Drawing Sheets

(56) References Cited

U.S. PATENT DOCUMENTS

| | | | | |
|---|---|---|---|---|
| 5,784,066 A * | 7/1998 | Aizikowitz | G06F 8/441 | 345/440 |
| 5,809,306 A * | 9/1998 | Suzuki | G06F 8/423 | 712/E9.017 |
| 6,090,156 A * | 7/2000 | MacLeod | G06F 8/441 | 717/144 |
| 6,516,463 B2 * | 2/2003 | Babaian | G06F 8/4441 | 717/156 |
| 6,523,173 B1 * | 2/2003 | Bergner | G06F 8/441 | 717/152 |
| 6,907,601 B1 * | 6/2005 | Hoflehner | G06F 8/441 | 711/147 |
| 7,124,271 B2 * | 10/2006 | Li | G06F 8/441 | 711/170 |
| 7,595,659 B2 * | 9/2009 | Vorbach | G06F 8/441 | 326/38 |
| 7,788,655 B2 * | 8/2010 | Plummer | G06F 8/441 | 717/152 |
| 2002/0059568 A1 * | 5/2002 | Kawahito | G06F 8/443 | 717/151 |
| 2002/0147969 A1 * | 10/2002 | Lethin | G06F 9/45504 | 717/138 |
| 2002/0170044 A1 * | 11/2002 | Tarditi | G06F 8/441 | 717/154 |
| 2003/0005271 A1 * | 1/2003 | Hsu | G06F 9/3802 | 712/237 |
| 2003/0079210 A1 * | 4/2003 | Markstein | G06F 8/441 | 717/152 |
| 2003/0217356 A1 * | 11/2003 | Baraz | G06F 8/441 | 717/158 |
| 2004/0015901 A1 * | 1/2004 | Koseki | G06F 8/441 | 717/140 |
| 2005/0071438 A1 * | 3/2005 | Liao | G06F 8/4442 | 709/214 |
| 2007/0050603 A1 * | 3/2007 | Vorbach | G06F 9/30181 | 712/221 |
| 2009/0064112 A1 * | 3/2009 | Inagaki | G06F 8/441 | 717/140 |
| 2011/0138372 A1 * | 6/2011 | Damron | G06F 8/441 | 717/154 |
| 2011/0161945 A1 * | 6/2011 | Kalogeropulos | G06F 8/441 | 717/152 |
| 2011/0167415 A1 * | 7/2011 | Hayashida | G06F 8/441 | 717/142 |
| 2011/0238948 A1 * | 9/2011 | Vorbach | G06F 15/7867 | 712/15 |
| 2015/0106596 A1 * | 4/2015 | Vorbach | G06F 9/3001 | 712/221 |

OTHER PUBLICATIONS

International Preliminary Report on Patentability and Written Opinion dated Apr. 28. 2016 issued in related/corresponding PCT Appl. No. PCT/IB2014/002780, filed Sep. 12, 2014.

* cited by examiner

SYSTEMS AND METHODS FOR REGISTER ALLOCATION

CROSS-REFERENCE TO RELATED APPLICATIONS

This disclosure claims priority to and benefit from U.S. Provisional Patent Application No. 61/892,638, filed on Oct. 18, 2013, the entirety of which is incorporated herein by reference.

FIELD

The technology described in this patent document relates generally to program execution and more particularly to register allocation for program execution.

BACKGROUND

Just-in-time compilation (JIT), also known as dynamic translation, is compilation done during execution of a program or an application at run time, rather than prior to execution. Often JIT involves translation/compilation to native codes for a machine (e.g., a computer), which are then executed directly by one or more processors of the machine.

JIT compilers may be used for generating native codes for Java programs. Java programs may be run on any machine on which a Java virtual machine (JVM) is executing. A Java program includes a plurality of object classes, and each object class can have zero or more methods. When a Java program is executed, the methods of the object classes are invoked and executed.

A java method may be executed in one of two ways. One way is for the NM to execute the method in an interpretive manner. For example, before a Java program is executed, source codes of the program (e.g., the source codes of the methods) is broken down into Java bytecodes. At runtime, the Java interpreter of the JVM interprets the bytecodes of a method, which is a relatively slow process. As an alternative, the NM may choose not to interpret a method, but rather compile the bytecodes of the method down into native codes, e.g., using a JIT compiler at runtime. The JVM then causes the native codes to be executed directly by one or more processors.

Local variables associated with the execution of native codes generated by a JIT compiler often need to be loaded from memory, which is a time consuming process. One way to improve the execution of the native codes generated by the JIT compiler is to maintain often-used local variables in physical registers (e.g., hardware registers) as much as possible. Register allocation is an important optimization process for improving efficiency. For example, a linear scan algorithm can be implemented for register allocation. The linear scan algorithm involves assigning registers to variables in a single linear scan over live intervals of all variables in a program. A live interval of a variable corresponds to a range of instructions starting at a defining instruction and ending at an instruction where the variable is used for the last time. If the live intervals of two variables overlap, the variables cannot reside in a same physical register.

SUMMARY

In accordance with the teachings described herein, system and methods are provided for register allocation. An original code block and a target code block associated with a branch of an execution loop are determined. An original allocation of a plurality of physical registers to one or more original variables associated with the original code block is detected. A target allocation of the plurality of physical registers to one or more target variables associated with the target code block is determined. One or more temporary registers are selected from the plurality of physical registers based at least in part on the original allocation and the target allocation. The original allocation is changed to the target allocation using the selected temporary registers. Specifically, one or more instructions are generated to change the original allocation to the target allocation using the selected temporary registers. The instructions are executed using one or more processors.

In one embodiment, a processor-implemented system for register allocation includes: one or more non-transitory machine-readable storage media for storing a computer database having a database schema that includes and interrelates original variable fields, target variable fields, original allocation fields, and target allocation fields. The original variable fields store one or more original variables associated with an original code block. The target variable fields store one or more target variables associated with a target code block, the original code block and the target code block being associated with a branch of an execution loop. The original allocation fields store original data representing an original allocation of a plurality of physical registers to the original variables. The target allocation fields store target data representing a target allocation of the plurality of physical registers to the target variables. The system further includes one or more processors configured to: process a database query that operates over data related to the original variable fields, the target variable fields, the original allocation fields, and the target allocation fields; select one or more temporary registers from the plurality of physical registers based at least in part on the original data and the target data; and change the original allocation of the plurality of physical registers to the target allocation of the plurality of physical registers using the temporary registers, the physical registers being included in the processors.

In another embodiment, a system for register allocation includes: one or more processors including a plurality of physical registers, and a computer-readable storage medium encoded with instructions for commanding the data processors to execute certain operations. An original code block and a target code block associated with a branch of an execution loop are determined. An original allocation of a plurality of physical registers to one or more original variables associated with the original code block is detected. A target allocation of the plurality of physical registers to one or more target variables associated with the target code block is determined. One more temporary registers are selected from the plurality of physical registers based at least in part on the original allocation and the target allocation. The original allocation is changed to the target allocation using the selected temporary registers. Specifically, one or more instructions are generated to change the original allocation to the target allocation rising the selected temporary registers. The instructions are executed using one or more processors.

DETAILED DESCRIPTION

Linear scan register allocation is widely applied to JIT compliers which are sensitive to compiling time. However, under some circumstances (e.g., execution loops), conflicts may occur during the register allocation process and need to be resolved for executing programs correctly.

Figure 1:
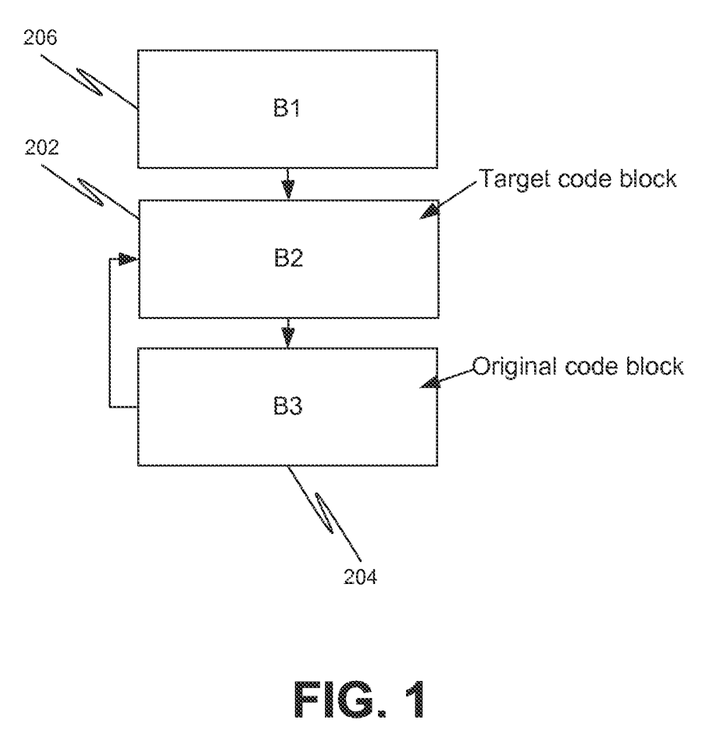
FIG. 1 depicts an example diagram showing a flow chart involving a plurality of code blocks.

FIG. 1 depicts an example diagram showing a flow chart involving a plurality of code blocks. As shown in FIG. 1, code blocks 202 and 204 are included in an execution loop. Register allocation (e.g., with a linear scan algorithm) is performed for executing the code blocks. Conflicts occur in the register allocation process fir the code block 202 and the code block 204.

Specifically, a code block 206 is executed first. Then, a forward loop branch starts from the code block 202 and ends at the code block 204, and a backward loop branch starts from the code block 204 and ends at the code block 202. In the forward loop branch, the register allocation is performed for the code block 202, and one or more physical registers (e.g., hardware registers in one or more processors) are allocated to one or more variables, e.g., as shown in Table 1.

TABLE 1

| Registers | Variables |
|---|---|
| r0 | v0 |
| r1 | v3 |
| r2 | v1 |
| r3 | v2 |
| r6 | v4 |
| r7 | v5 |
| r8 | v6 |

Then, for the code block 204, the register allocation is performed, and the physical registers are allocated to certain variables, e.g., as shown in Table 2.

TABLE 2

| Registers | Variables |
|---|---|
| r0 | v0 |
| r1 | v1 |
| r4 | v3 |
| r6 | v5 |
| r7 | v6 |
| r8 | v4 |
| r9 | v7 | in the backward loop branch, i.e., from the code block 204 back to the code block 202, the physical registers, as shown in Table 2, do not contain proper variables for executing the code block 202 which needs the register allocation as shown in Table 1. Such conflicts need to be resolved for correct execution of code blocks.

One way to resolve the conflicts is to store current values in all physical registers that are involved in the conflicts to a memory first, and then load desired values from the memory to the physical registers. However, the storing operations and the loading operations involving the memory are often time consuming, and are not optimal for dynamic compilation.

Figure 2:
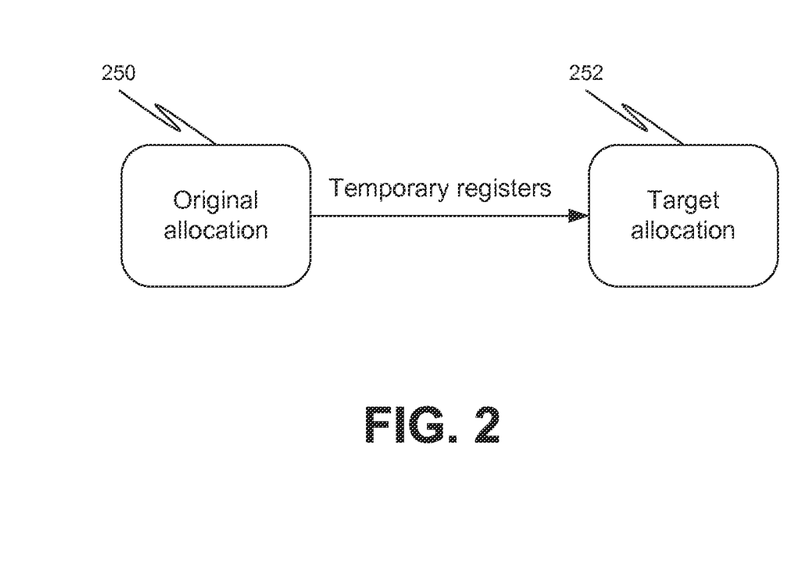
FIG. 2 depicts an example diagram showing conflict resolution of register allocation.

Instead, one or more temporary registers may be implemented for resolving the conflicts. For example, certain physical registers are selected as temporary registers for storing or moving data to reduce time consumption. FIG. 2 depicts an example diagram showing conflict resolution of register allocation. As shown in FIG. 2, an original allocation 250 for the code block 204 is changed using one or more temporary registers to a target allocation 252 for the code block 202.

Specifically, the original allocation 250 corresponds to the allocation of the physical registers to the variables as shown in Table 2. The target allocation 252 corresponds to the allocation of the physical registers to the variables as shown in Table 1. To correctly execute the code block 202 in the backward loop branch (e.g., as shown in FIG. 1), temporary registers are selected from the physical registers. Current values stored in certain physical registers are moved to the temporary registers first, and then desired values are moved into the physical registers, so that conflicts in register allocation can be resolved.

Figure 3:
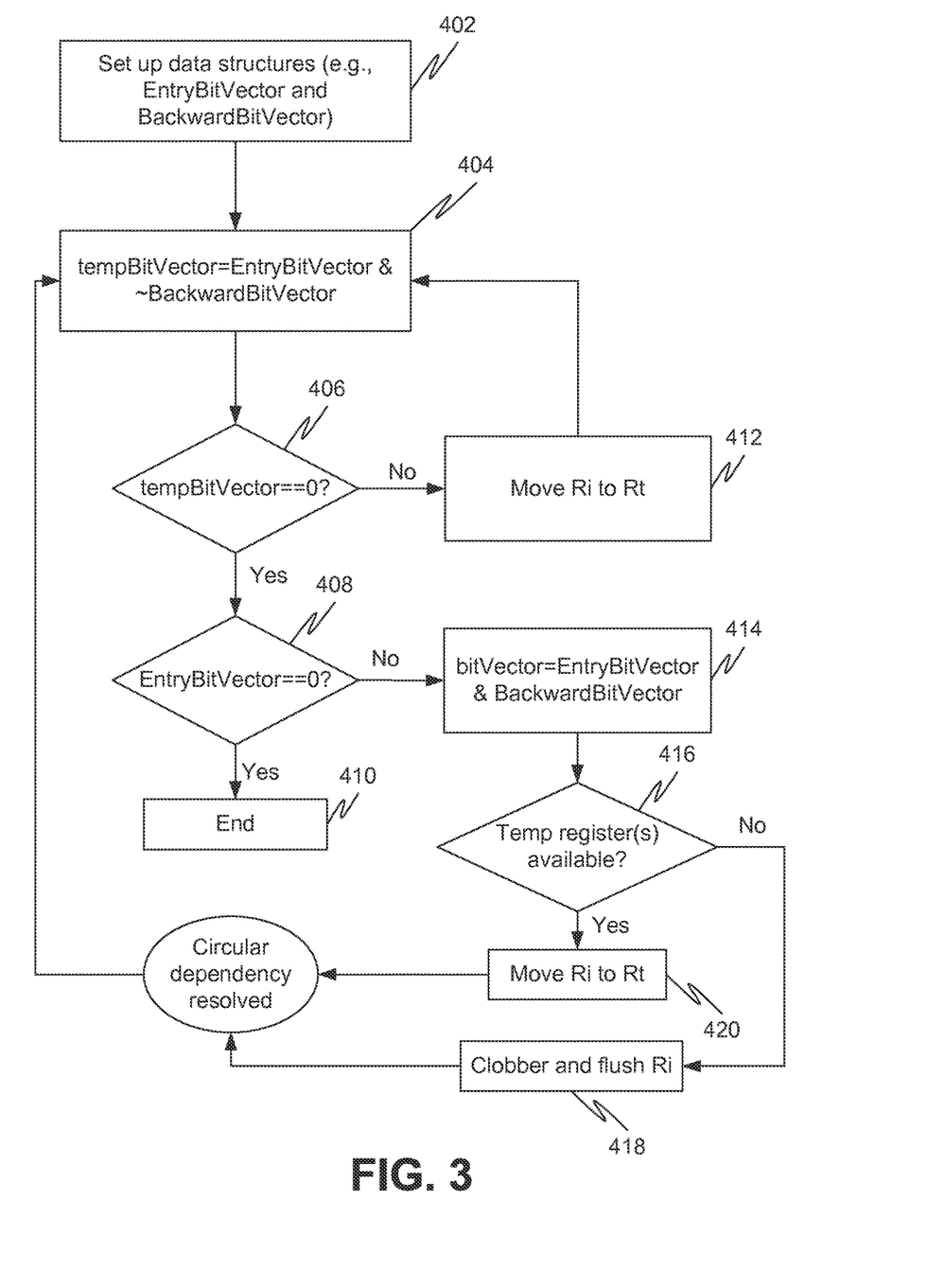
FIG. 3 depicts an example diagram for conflict resolution of register allocation.

FIG. 3 depicts an example diagram for conflict resolution of register allocation. As shown in FIG. 3, temporary registers are used to move data around for conflict resolution in register allocation. Specifically, at 402, certain data structures (e.g., EntryR2Vmap, EntryBitVector, and BackwardBitVector) are set up. Table 3 shows an example data structure EntryR2Vmap that corresponds to the target allocation 252 (e.g., as shown in Table 1). Particularly, the numerical values in the data structure EntryR2Vmap indicate the variables that correspond to one or more physical registers in the target allocation 252. For example, the physical register r0 is allocated to the variable v0, and the physical register r1 is allocated to the variable v3.

TABLE 3

| | Physical register | | | | | | | | | |
|---|---|---|---|---|---|---|---|---|---|---|
| | 0 | 1 | 2 | 3 | 4 | 5 | 6 | 7 | 8 | 9 |
| EntryR2VMap | 0 | 3 | 1 | 2 | | | 4 | 5 | 6 | |

A data structure EntryBitVector associated with the target allocation is set up as shown in Table 4. Specifically, the values in the data structure EntryBitVector indicate whether a particular physical register is allocated to a variable in the target allocation. For example, if the value of a particular bit of the data structure EntryBitVector is 1, it indicates that a corresponding physical register is allocated to a variable in the target allocation. If the value of a particular bit of the data structure EntryBitVector is 0, it indicates that a corresponding physical register is not allocated to any variable in the target allocation.

TABLE 4

| | Physical register | | | | | | | | | |
|---|---|---|---|---|---|---|---|---|---|---|
| | 0 | 1 | 2 | 3 | 4 | 5 | 6 | 7 | 8 | 9 |
| EntryR2VMap | 0 | 3 | 1 | 2 | | | 4 | 5 | 6 | |
| EntryBitVector | 1 | 1 | 1 | 1 | 0 | 0 | 1 | 1 | 1 | 0 |

A data structure BackwardBitVector is set up to indicate the statuses of the physical registers. For example, the data structure BackwardBitVector is set up according to the following algorithm:

```
for a physical register R associated with the original allocation 250
    if R is not allocated to any variable in the original allocation 250,
mark R as available to be a temporary register;
        if R is allocated to a variable V in the original allocation 250,
            if V is not included in the target allocation 252 (i.e., V is not in
EntryR2VMap)
                store a value of V back to a memory;
                free R; and
                mark R as available to be a temporary register;
            else (i.e., V is included in the target allocation 252)
                if EntryR2VMap[R] == V (i.e., no conflicts to resolve),
                    clearBit(EntryBitVector, R);
                else
                    setBit(BackwardBitVeetor, R);
                endif
            endif
    endif
endfor
```

For example, in the original allocation 250 (e.g., as shown in Table 2), the physical register r9 is allocated to the variable v7. However, no physical register is allocated to the variable r7 in the target allocation 252 (e.g., as shown in Table 1). Thus, according to the above algorithm, the value of the variable v7 in the physical register r9 is stored back to a memory, and the physical register r9 is freed to be available as a temporary register.

After the data structure BackwardBitVector is set up according to the above-noted algorithm, Table 5 shows an example diagram of resulting data structures.

TABLE 5

|  | Physical register | | | | | | | | | |
|---|---|---|---|---|---|---|---|---|---|---|
|  | 0 | 1 | 2 | 3 | 4 | 5 | 6 | 7 | 8 | 9 |
| EntryR2VMap | 0 | 3 | 1 | 2 |   |   | 4 | 5 | 6 |   |
| EntryBitVector | 0 | 1 | 1 | 1 | 0 | 0 | 1 | 1 | 1 | 0 |
| BackwardBitVector | 0 | 1 | 0 | 0 | 1 | 0 | 1 | 1 | 1 | 0 |

Referring to FIG. 3, at 404, a data structure tempBitVector is determined based on the data structures EntryBitVector and BackwardBitVector. Specifically, a logic operation (i.e., NOT) is performed on the data structure BackwardBitVector to generate an intermediate result. Another logic operation "&" (i.e., AND) is performed on the intermediate result and the data structure EntryBitVector to generate the data structure tempBitVector. Table 6 shows an example of the data structure tempBitVector.

TABLE 6

|  | Physical register | | | | | | | | | |
|---|---|---|---|---|---|---|---|---|---|---|
|  | 0 | 1 | 2 | 3 | 4 | 5 | 6 | 7 | 8 | 9 |
| EntryBitVector | 0 | 1 | 1 | 1 | 0 | 0 | 1 | 1 | 1 | 0 |
| BackwardBitVector | 0 | 1 | 0 | 0 | 1 | 0 | 1 | 1 | 1 | 0 |
| tempBitVector | 0 | 0 | 1 | 1 | 0 | 0 | 0 | 0 | 0 | 0 |

At 406, it is determined whether the data structure tempBitVector is equal to 0 (i.e., whether every bit of tempBitVector is equal to 0). If the data structure tempBitVector is not equal to 0, at 412, one or more physical registers that correspond to the non-zero bits in the data structure tempBitVector are available to receive values of corresponding target variables according to the target allocation 252. For example, as shown in Table 6, a bit of the data structure tempBitVector corresponding to the physical register r2 is not zero. It indicates that the physical register r2 is available to receive a value of the corresponding variable v1 in the target allocation 252 as shown in Table 1. In the original allocation as shown in Table 2, the physical register r1 is allocated to the variable v1. Thus, the value in the physical register r1 can be moved directly to the physical register r2 as part of the process for changing the original allocation to the target allocation.

In addition, as shown in Table 6, a bit of the data structure tempBitVector corresponding to the physical register r3 is not zero. It indicates that the physical register r3 is available to receive a value of the corresponding variable v2 in the target allocation 252 as shown in Table 1. However, no physical register is allocated to the variable v2 in the original allocation as shown in Table 2. Thus, a value of the variable v2 may be loaded from a memory to the physical register as part of the process for changing the original allocation to the target allocation.

An algorithm for the process at 412 is as follows, where Ri represents a physical register that is available to receive a value of a corresponding variable in the target allocation 252:

```
for each set bit in tempBitVector
    index = set bit index in tempBitVector;
    int src=moveRegTo(index);
    if Rsrc is available to be a temporary register, mark it as an available
temporary register;
endfor
function moveRegTo(int i)
    V = EntryR2VMap(i);
    if Rs is allocated to V in the original allocation 250
        move Ri, Rs;
        clearBit(EntryBitVector, i);
        clearBit(BackwardBitVector, s);
        return s;
    else
        load V to Ri;
        clearBit(EntryBitVector, i);
    endif
endfunction
```

Table 7 shows an example of the resulting data structures after the process at 412.

TABLE 7

|  | Physical register | | | | | | | | | |
|---|---|---|---|---|---|---|---|---|---|---|
|  | 0 | 1 | 2 | 3 | 4 | 5 | 6 | 7 | 8 | 9 |
| EntryBitVector | 0 | 1 | 0 | 0 | 0 | 0 | 1 | 1 | 1 | 0 |
| BackwardBitVector | 0 | 0 | 0 | 0 | 1 | 0 | 1 | 1 | 1 | 0 |
| tempBitVector | 0 | 0 | 1 | 1 | 0 | 0 | 0 | 0 | 0 | 0 |

Then, the process at 404 is executed again. Table 8 shows an example of the resulting data structures after the process at 404.

TABLE 8

|  | Physical register | | | | | | | | | |
|---|---|---|---|---|---|---|---|---|---|---|
|  | 0 | 1 | 2 | 3 | 4 | 5 | 6 | 7 | 8 | 9 |
| EntryBitVector | 0 | 1 | 0 | 0 | 0 | 0 | 1 | 1 | 1 | 0 |
| BackwardBitVector | 0 | 0 | 0 | 0 | 1 | 0 | 1 | 1 | 1 | 0 |
| tempBitVector | 0 | 1 | 0 | 0 | 0 | 0 | 0 | 0 | 0 | 0 |

As shown in Table 8, the data structure tempBitVector is not equal to 0, and the process at 412 is executed again. Specifically, a bit of the data structure tempBitVector corresponding to the physical register 1 is not zero. It indicates that the physical register r1 is available to receive a value of the corresponding variable v3 in the target allocation 252 as shown in Table 1. In the original allocation as shown in Table 2, the physical register r4 is allocated to the variable v1. Thus, the value in the physical register r4 can be moved directly to the physical register r1 as part of the process for changing the original allocation to the target allocation.

According to the above algorithm for the process at 412, Table 9 shows an example of the resulting data structures after the process at 412.

TABLE 9

| | Physical register | | | | | | | | | |
|---|---|---|---|---|---|---|---|---|---|---|
| | 0 | 1 | 2 | 3 | 4 | 5 | 6 | 7 | 8 | 9 |
| EntryBitVector | 0 | 0 | 0 | 0 | 0 | 0 | 1 | 1 | 1 | 0 |
| BackwardBitVector | 0 | 0 | 0 | 0 | 0 | 0 | 1 | 1 | 1 | 0 |
| tempBitVector | 0 | 1 | 0 | 0 | 0 | 0 | 0 | 0 | 0 | 0 |

Then, the process at 404 is executed again. Table 10 shows an example of the result data structures after the process at 404.

TABLE 10

| | Physical register | | | | | | | | | |
|---|---|---|---|---|---|---|---|---|---|---|
| | 0 | 1 | 2 | 3 | 4 | 5 | 6 | 7 | 8 | 9 |
| EntryBitVector | 0 | 0 | 0 | 0 | 0 | 0 | 1 | 1 | 1 | 0 |
| BackwardBitVector | 0 | 0 | 0 | 0 | 0 | 0 | 1 | 1 | 1 | 0 |
| tempBitVector | 0 | 0 | 0 | 0 | 0 | 0 | 0 | 0 | 0 | 0 |

As shown in Table 10, the data structure tempBitVector is equal to 0. At 408, it is determined that the data structure EntryBitVector is not equal to 0. At 414, a new data structure bitVector is determined based on the data structures EntryBitVector and BackwardBitVector. Specifically, a logic operation "&" (i.e., AND) is performed on the data structures EntryBitVector and BackwardBitVector to generate the data structure bitVector. Table 11 shows an example of the resulting data structures.

TABLE 11

| | Physical register | | | | | | | | | |
|---|---|---|---|---|---|---|---|---|---|---|
| | 0 | 1 | 2 | 3 | 4 | 5 | 6 | 7 | 8 | 9 |
| EntryBitVector | 0 | 0 | 0 | 0 | 0 | 0 | 1 | 1 | 1 | 0 |
| BackwardBitVector | 0 | 0 | 0 | 0 | 0 | 0 | 1 | 1 | 1 | 0 |
| tempBitVector | 0 | 0 | 0 | 0 | 0 | 0 | 0 | 0 | 0 | 0 |
| bitVector | 0 | 0 | 0 | 0 | 0 | 0 | 1 | 1 | 1 | 0 |

At 416, it is determined whether any temporary registers are available. If there is no temporary register available, at 418, values in one or more physical registers that correspond to the non-zero bits in the data structure bitVector are stored back to the memory and the physical registers are freed. If one or more temporary registers are available, at 420, the temporary registers are used to move data around in the physical registers as part of the process for changing the original allocation to the target allocation. An algorithm for the processes at 416, 418 and 420 is as follows:

```
if a temporary register Rt is available
    move Rt, Ri;
    clearBit(BackwardBitVector, i);
    setBit(BackwardBitVector, t);
    mark Rt to be used (i.e., Rt cannot be used as a temporary register);
else
    store a variable value in Ri back to a memory;
    free Ri;
    clearBit(BackwardBitVector, i);
endif
```

For example, as shown in Table 11, a bit of the data structure bitVector corresponding to the physical register r6 is not zero. As described above, the physical register r9 is available as a temporary register. Thus, a value of the variable v5 stored in the physical register r6 according to the original allocation as shown in Table 2, is moved to the physical register r9. Table 12 shows an example of the resulting data structures.

TABLE 12

| | Physical register | | | | | | | | | |
|---|---|---|---|---|---|---|---|---|---|---|
| | 0 | 1 | 2 | 3 | 4 | 5 | 6 | 7 | 8 | 9 |
| EntryBitVector | 0 | 0 | 0 | 0 | 0 | 0 | 1 | 1 | 1 | 0 |
| BackwardBitVector | 0 | 0 | 0 | 0 | 0 | 0 | 0 | 1 | 1 | 1 |
| tempBitVector | 0 | 0 | 0 | 0 | 0 | 0 | 0 | 0 | 0 | 0 |
| bitVector | 0 | 0 | 0 | 0 | 0 | 0 | 1 | 1 | 1 | 0 |

Then, the process at 404 is executed again. Table 13 shows an example of the resulting data structures after the process at 404.

TABLE 13

| | Physical register | | | | | | | | | |
|---|---|---|---|---|---|---|---|---|---|---|
| | 0 | 1 | 2 | 3 | 4 | 5 | 6 | 7 | 8 | 9 |
| EntryBitVector | 0 | 0 | 0 | 0 | 0 | 0 | 1 | 1 | 1 | 0 |
| BackwardBitVector | 0 | 0 | 0 | 0 | 0 | 0 | 0 | 1 | 1 | 1 |
| tempBitVector | 0 | 0 | 0 | 0 | 0 | 0 | 1 | 0 | 0 | 0 |
| bitVector | 0 | 0 | 0 | 0 | 0 | 0 | 1 | 1 | 1 | 0 |

Then, the process at 406 is executed. As shown in Table 13, a bit of the data structure tempBitVector corresponding to the physical register r6 is not zero. It indicates that the physical register r6 is available to receive a value of the corresponding variable v4 in the target allocation 252 as shown in Table 1. In the original allocation as shown in Table 2, the physical register r8 is allocated to the variable v4. The process at 412 is executed. That is, the value in the physical register r8 can be moved directly to the physical register r6 as part of the process for changing the original allocation to the target allocation. Then, the process 404 is executed again. Table 14 shows an example of the resulting data structures.

TABLE 14

| | Physical register | | | | | | | | | |
|---|---|---|---|---|---|---|---|---|---|---|
| | 0 | 1 | 2 | 3 | 4 | 5 | 6 | 7 | 8 | 9 |
| EntryBitVector | 0 | 0 | 0 | 0 | 0 | 0 | 0 | 1 | 1 | 0 |
| BackwardBitVector | 0 | 0 | 0 | 0 | 0 | 0 | 1 | 0 | 1 | 1 |
| tempBitVector | 0 | 0 | 0 | 0 | 0 | 0 | 0 | 0 | 1 | 0 |
| bitVector | 0 | 0 | 0 | 0 | 0 | 0 | 1 | 1 | 1 | 0 |

Then, the process at 406 is executed. As shown in Table 14, a bit of the data structure tempBitVector corresponding to the physical register r8 is not zero. It indicates that the physical register r8 is available to receive a value of the corresponding variable v6 in the target allocation 252 as shown in Table 1. In the original allocation as shown in Table 2, the physical register r7 is allocated to the variable v6. The process at 412 is executed. That is, the value in the physical register r7 can be moved directly to the physical register r8 as part of the process for changing the original allocation to the target allocation. Then, the process 404 is executed again. Table 15 shows an example of the resulting data structures.

TABLE 15

| | Physical register | | | | | | | | | |
|---|---|---|---|---|---|---|---|---|---|---|
| | 0 | 1 | 2 | 3 | 4 | 5 | 6 | 7 | 8 | 9 |
| EntryBitVector | 0 | 0 | 0 | 0 | 0 | 0 | 0 | 1 | 0 | 0 |
| BackwardBitVector | 0 | 0 | 0 | 0 | 0 | 0 | 0 | 0 | 0 | 1 |
| tempBitVector | 0 | 0 | 0 | 0 | 0 | 0 | 0 | 1 | 0 | 0 |
| bitVector | 0 | 0 | 0 | 0 | 0 | 0 | 1 | 1 | 1 | 0 |

Then, the process at 406 is executed. As shown in Table 15, a bit of the data structure tempBitVector corresponding to the physical register r7 is not zero. It indicates that the physical register r7 is available to receive a value of the corresponding variable v5 in the target allocation 252 as shown in Table 1. As described above, the physical register r9 includes a value of the variable v5. The process at 412 is executed. That is, the value in the physical register r9 can be moved directly to the physical register r7 as part of the process for changing the original allocation to the target allocation. Then, the process 404 is executed again. Table 16 shows an example of the resulting data structures.

TABLE 16

| | Physical register | | | | | | | | | |
|---|---|---|---|---|---|---|---|---|---|---|
| | 0 | 1 | 2 | 3 | 4 | 5 | 6 | 7 | 8 | 9 |
| EntryBitVector | 0 | 0 | 0 | 0 | 0 | 0 | 0 | 0 | 0 | 0 |
| BackwardBitVector | 0 | 0 | 0 | 0 | 0 | 0 | 0 | 0 | 0 | 0 |
| tempBitVector | 0 | 0 | 0 | 0 | 0 | 0 | 0 | 0 | 0 | 0 |
| bitVector | 0 | 0 | 0 | 0 | 0 | 0 | 1 | 1 | 1 | 0 |

At 406, it is determined that the data structure tempBitVector is equal to 0. At 408, it is determined that the data structure EntryBitVector is equal to 0, and it indicates that there are no more conflicts to be resolved. Thus, at 410, the conflict resolution process ends. In some embodiments, an additional data structure may be set up for the original allocation 250. An algorithm for the entire conflict resolution process as shown in FIG. 3 is as follows:

```
while (true)
    tempBitVector = EntyBitVector & ~BackwardBitVector;
    if tempBitVector != 0
        for each set bit in tempBitVector
            index = set bit index in tempBitVector;
            int src=moveRegTo(index);
            if Rsrc is available to be a temporary register, mark it as an
                available
                temporary register;
        endfor
    else
        if EntryBitVector != 0
```

-continued

```
            bitVector = EntryBitVector & BackwardBitVector;
            i = first set bit index in bitVector;
            if a temporary register Rt is available
                move Rt, Ri;
                clearBit(BackwardBitVector, i);
                setBit(BackwardBitVector, t);
                mark Rt to be used (i.e., Rt cannot be used as a
                    temporary register);
            else
                store a variable value in Ri back to a memory;
                free Ri;
                clearBit(BackwardBitVector, i);
            endif
        else
            break;
    endif
endwhile
    function moveRegTo(int i)
        V = EntryR2VMap(i);
        if Rs is allocated to V in the original allocation 250
            move Ri, Rs;
            clearBit(EntryBitVector, i);
            clearBit(BackwardBitVector, s);
            return s;
        else
            load V to Ri;
            clearBit(EntryBitVector, i);
        endif
    endfunction
```

Correspondingly, instructions can be generated as follows to be executed by one or more processors:

```
str r9, [v7]
mov r2, r1
ldr r3, [v2]
mov r1, r4
mov r9, r6
mov r6, r8
mov r8, r7
mov r7, r9
```

Figure 4:
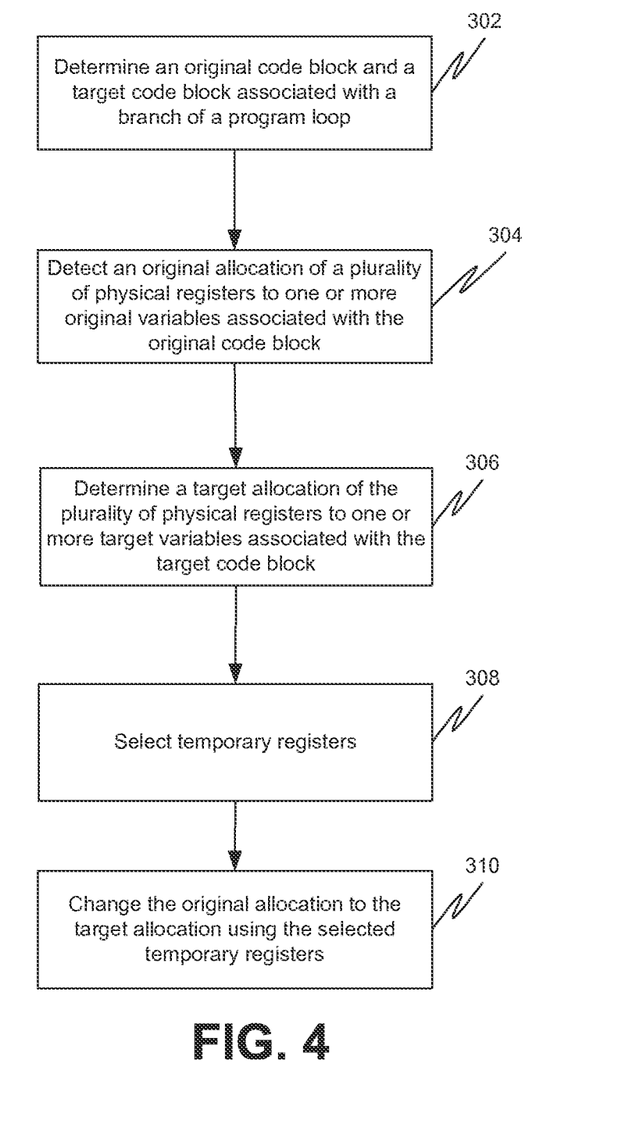
FIG. 4 depicts an example flowchart for register allocation.

FIG. 4 depicts an example flow chart for register allocation. As shown in FIG. 4, at 302, an original code block and a target code block associated with a branch of an execution loop are determined. At 304, an original allocation of a plurality of physical registers to one or more original variables associated with the original code block is detected. At 306, a target allocation of the plurality of physical registers to one or more target variables associated with the target code block is determined. At 308, one or more temporal registers are selected from the plurality of physical registers based at least in part on the original allocation and the target allocation. At 310, the original allocation is changed to the target allocation using the selected temporary registers. Specifically, one or more instructions are generated to change the original allocation to the target allocation using the selected temporary registers. The instructions are executed using one or more processors. For example, the plurality of physical registers are included in the processors.

Figure 5:
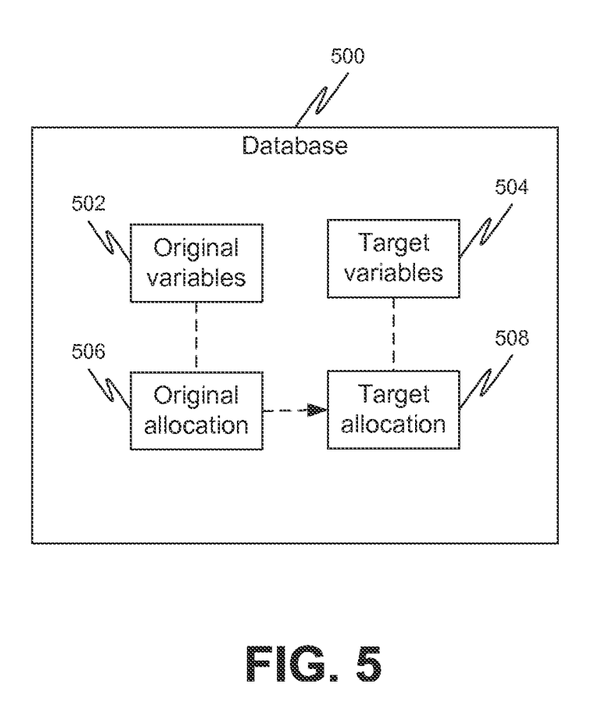
FIG. 5 depicts an example diagram showing a database.

FIG. 5 depicts an example diagram showing a database. As shown in FIG. 5, the database 500 includes a database schema that includes and interrelates original variable fields 502, target variable fields 504, original allocation fields 506, and target allocation fields 508. For example, the database 500 is stored in one or more non-transitory machine-readable storage media.

Specifically, the original variable fields 502 store one or more original variables associated with an original code block. The target variable fields 504 store one or more target variables associated with a target code block. The original code block and the target code block are associated with a branch of an execution loop. The original allocation fields 506 store original data representing an original allocation of a plurality of physical registers to the original variables. The target allocation fields 508 store target data representing a target allocation of the plurality of physical registers to the target variables.

In some embodiments, one or more processors are configured to process a database query that operates over data related to the original variable fields, the target variable fields, the original allocation fields, and the target allocation fields. Particularly, the processors are configured to select one or more temporary registers from the plurality of physical registers based at least in part on the original data and the target data, and change the original allocation of the plurality of physical registers to the target allocation of the plurality of physical registers using the temporary registers, the physical registers being included in the processors.

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:

1. A method for register allocation, the method comprising:
    determining an original code block and a target code block associated with a branch of an execution loop, for execution by a processor device that comprises one or more processors and that includes physical processor registers including a first register and a second register;
    detecting an original allocation of the registers to variables associated with the original code block, which has been executed by the processor device;
    determining a target allocation of the registers to variables associated with the target code block, which is to be executed by the processor device;
    selecting a register, from among the processor registers, to be a temporary register, based at least in part on the register conforming to at least one of (i) the register not being allocated to a variable in the original allocation and (ii) the register not being allocated to a variable in the target allocation, wherein the selection of a register to be the temporary register includes:
        maintaining a first data structure having one bit for each register;
        setting each first data structure having one bit to a first state in response to the corresponding register being allocated in the target allocation to a variable that is allocated to a different register in the original allocation, and otherwise setting the first data structure to a second state;
        maintaining a second data structure having one bit for each register;
        setting each second data structure bit to the first state in response to the corresponding register being allocated in the original allocation to a variable that is allocated to a different register in the target allocation, and otherwise setting the second data structure bit to the second state;
        maintaining a third data structure having one bit for each register;
        determining each third data structure bit as a Boolean logic function of the corresponding first data structure bit and the corresponding second data structure bit;
        wherein the selection of a register to be a temporary register is based on the state of the corresponding third data structure bit;
    changing, by the processor device, from the original allocation to the target allocation using a process that includes:
        in response to determining that a first variable is allocated to the first register in the original allocation and to the second register in the target allocation, and that the second register is storing a value of a second variable,
            moving the value of the first variable from the first register to the temporary register,
            moving the value of the second variable from the second register to free up the second register, and
            moving the value of the first variable from the temporary register to the second register, such that the first variable is not used as an execution operand while being temporarily stored in the temporary register; and
    executing the target code block.

2. The method of claim 1, wherein:
    the branch of the execution loop corresponds to a backward loop branch from the original code block to the target code block; and
    the execution loop further includes a forward loop branch from the target code block to the original code block.

3. The method of claim 1, wherein the selecting the register includes:
    in response to determining that the selected register is allocated to a third variable in the original allocation and not allocated in the target allocation, freeing up the selected register by moving a value of the third variable from the selected register to a storage medium.

4. The method of claim 1, wherein the moving of the second variable from the second register includes moving the second variable from the second register to a third register in response to determining that the third register is allocated to the second variable in the target allocation.

5. The method of claim 1, further comprising:
    in response to determining that a fourth variable is not allocated in the original allocation and is allocated to a fourth register, from among the registers, in the target allocation, and that the fourth register is not currently allocated to a variable, loading a value of the fourth variable from a storage medium to the fourth register.

6. The method of claim 1, wherein the first state is "1" and the second state is "0", and the Boolean logic function includes ANDing the corresponding third data structure bit with an inverse of the corresponding second data structure bit, and the selection of a register to be a temporary register is based on the corresponding tempBitVector third data structure bit being a "1".

7. A method for register allocation, the method comprising:
- determining an original code block and a target code block associated with a branch of an execution loop, for execution by a processor device that comprises one or more processors and that includes physical processor registers including a first register and a second register;
- detecting an original allocation of the registers to variables associated with the original code block, which has been executed by the processor device;
- determining a target allocation of the registers to variables associated with the target code block, which is to be executed by the processor device;
- selecting a register, from among the processor registers, to be a temporary register, based at least in part on the register conforming to at least one of (i) the register not being allocated to a variable in the original allocation and (ii) the register not being allocated to a variable in the target allocation, wherein the selection of a register to be the temporary register includes:
  - maintaining a first data structure having one bit for each register;
  - setting each first data structure having one bit to a first state in response to the corresponding register being allocated in the target allocation to a variable that is allocated to a different register in the original allocation, and otherwise setting the first data structure to a second state;
  - maintaining a second data structure having one bit for each register;
  - setting each second data structure bit to the first state in response to the corresponding register being allocated in the original allocation to a variable that is allocated to a different register in the target allocation, and otherwise setting the second data structure bit to the second state;
- changing, by the processor device, from the original allocation to the target allocation using a process that includes:
  - in response to determining that a first variable is allocated to the first register in the original allocation and to the second register in the target allocation, and that the second register is storing a value of a second variable,
    - moving the value of the first variable from the first register to the temporary register,
    - moving the value of the second variable from the second register to free up the second register, and
    - moving the value of the first variable from the temporary register to the second register, such that the first variable is not used as an execution operand while being temporarily stored in the temporary register; and
- executing the target code block;
- maintaining a fourth data structure having one bit for each register; and
- determining each fourth data structure bit as a Boolean logic function of the corresponding first data structure bit and the corresponding second data structure bit;
- selecting a register, from among the registers, based on the respective fourth data structure being set in the first state; and
- moving a value from the selected register to a storage medium.

8. The method of claim 7, wherein the first state is "1" and the second state is "0", and the Boolean logic function includes ANDing the corresponding third data structure bit with the corresponding second data structure bit, and the selection of the register for moving the value in the register to the storage medium is based on the corresponding fourth data structure bit being a "1".

9. The method of claim 1, wherein the registers include a group of n registers that are together allocated to a same group of n variables in both the original allocation and the target allocation, and each of the n variables is allocated to a different register in the original allocation than in the target allocation, and wherein the first and second registers are among the group of registers.

10. A non-transitory processor readable data storage medium storing software instructions configured to be executed by a processor device, the processor device comprising one or more processors and including physical processor registers that include a first register and a second register, to:
- detect an original allocation of the registers to variables associated with an original code block, which has been executed by the processor device;
- determine a target allocation of the registers to variables associated with a target code block, which is to be executed by the processor device;
- select a register, from among the processor registers, to be a temporary register, based at least in part on the register conforming to at least one of (i) the register not being allocated to a variable in the original allocation and (ii) the register not being allocated to a variable in the target allocation;
- changing, by the processor device, from the original allocation to the target allocation using a process that includes:
  - in response to determining that a first variable is allocated to the first register in the original allocation and to the second register in the target allocation, and that the second register is storing a value of a second variable,
    - moving the value of the first variable from the first register to the temporary register,
    - moving the value of the second variable from the second register to free up the second register, and
    - moving the value of the first variable from the temporary register to the second register, such that the first variable is not used as an execution operand while being temporarily stored in the temporary register; and
- executing the target code block;
- wherein the storage medium includes a first data structure having one bit for each register, wherein each first data structure bit is set to a first state if the corresponding register is allocated in the target allocation to a variable that is allocated to a different register in the original allocation, and is otherwise set the first data structure to a second state;
- wherein the storage medium includes a second data structure having one bit for each register, wherein each second data structure bit is set to the first state if the corresponding register is allocated in the original allocation to a variable that is allocated to a different register in the target allocation, and is otherwise set to the second state;
- wherein the storage medium includes a third data structure having one bit for each register, and each third data structure bit corresponds to a Boolean logic function of the corresponding first data structure bit and the corresponding second data structure bit, and the software instructions are configured for selecting the temporary register based on the state of the corresponding third data structure bit.

11. The method of claim 10, wherein the first state is "1" and the second state is "0", and the Boolean logic function includes ANDing the corresponding third data structure bit with an inverse of the corresponding second data structure bit, and the selection of a register to be a temporary register is based on the corresponding third data structure bit being a "1".

12. A method for register allocation, the method comprising:
  determining an original code block and a target code block associated with a branch of an execution loop, for execution by a processor device that comprises one or more processors and that includes physical processor registers including a first register and a second register;
  detecting an original allocation of the registers to variables associated with the original code block, which has been executed by the processor device;
  determining a target allocation of the registers to variables associated with the target code block, which is to be executed by the processor device;
  selecting a register, from among the processor registers, to be a temporary register, based at least in part on the register conforming to at least one of (i) the register not being allocated to a variable in the original allocation and (ii) the register not being allocated to a variable in the target allocation, wherein the selection of a register to be the temporary register includes:
    maintaining a first data structure having one bit for each register;
    setting each first data structure having one bit to a first state in response to the corresponding register being allocated in the target allocation to a variable that is allocated to a different register in the original allocation, and otherwise setting the first data structure to a second state;
    maintaining a second data structure having one bit for each register;
    setting each second data structure bit to the first state in response to the corresponding register being allocated in the original allocation to a variable that is allocated to a different register in the target allocation, and otherwise setting the second data structure bit to the second state;
  changing, by the processor device, from the original allocation to the target allocation using a process that includes:
    in response to determining that a first variable is allocated to the first register in the original allocation and to the second register in the target allocation, and that the second register is storing a value of a second variable,
      moving the value of the first variable from the first register to the temporary register,
      moving the value of the second variable from the second register to free up the second register, and
      moving the value of the first variable from the temporary register to the second register, such that the first variable is not used as an execution operand while being temporarily stored in the temporary register; and
  executing the target code block;
  wherein the storage medium includes a fourth data structure having one bit for each register, wherein each fourth data structure bit corresponds to a Boolean logic function of the corresponding first data structure bit and the corresponding second data structure bit, and the software instructions are configured to select a register, from among the registers, based on the respective fourth data structure being set in the first state and to move a value from the selected register to a storage medium.

* * * * *